United States Patent
Wilson et al.

(10) Patent No.: US 8,977,696 B2
(45) Date of Patent: Mar. 10, 2015

(54) DECLASSIFYING OF SUSPICIOUS MESSAGES

(71) Applicant: SonicWALL, Inc., San Jose, CA (US)

(72) Inventors: Brian K. Wilson, Palo Alto, CA (US); Kwok H. Ng, San Jose, CA (US); Damon K. Uyeda, San Francisco, CA (US); Scott D. Eikenberry, Menlo Park, CA (US); David A. Koblas, Los Altos, CA (US)

(73) Assignee: SonicWALL, Inc., San Jose, CA (US)

( * ) Notice: Subject to any disclaimer, the term of this patent is extended or adjusted under 35 U.S.C. 154(b) by 0 days.

(21) Appl. No.: 13/648,259

(22) Filed: Oct. 9, 2012

(65) Prior Publication Data

US 2013/0191473 A1 Jul. 25, 2013

Related U.S. Application Data

(63) Continuation of application No. 13/085,421, filed on Apr. 12, 2011, now Pat. No. 8,285,804, which is a continuation of application No. 11/927,514, filed on Oct. 29, 2007, now Pat. No. 7,925,707, which is a continuation of application No. 10/830,410, filed on Apr. 21, 2004, now Pat. No. 7,546,348.

(60) Provisional application No. 60/469,093, filed on May 5, 2003.

(51) Int. Cl.
G06F 15/16 (2006.01)

(52) U.S. Cl.
USPC ............................. 709/206; 709/202; 709/204

(58) Field of Classification Search
USPC .......................................... 709/202, 204, 206
See application file for complete search history.

(56) References Cited

U.S. PATENT DOCUMENTS

| | | | |
|---|---|---|---|
| 6,052,709 A | 4/2000 | Paul | |
| 6,073,142 A | 6/2000 | Geiger et al. | |
| 6,161,130 A * | 12/2000 | Horvitz et al. | 709/206 |
| 6,289,350 B1 | 9/2001 | Shapiro et al. | |
| 6,421,709 B1 | 7/2002 | McCormick et al. | |
| 6,434,624 B1 | 8/2002 | Gai et al. | |
| 6,453,327 B1 | 9/2002 | Nielsen | |
| 6,631,363 B1 | 10/2003 | Brown et al. | |
| 6,748,422 B2 | 6/2004 | Morin et al. | |
| 6,769,016 B2 | 7/2004 | Rothwell et al. | |
| 6,778,941 B1 | 8/2004 | Worrell et al. | |
| 6,931,433 B1 | 8/2005 | Ralston et al. | |

(Continued)

FOREIGN PATENT DOCUMENTS

| | | |
|---|---|---|
| EP | 0 952 558 A2 | 12/2008 |
| EP | 0 861 461 B2 | 3/2012 |
| WO | WO 01/13576 A2 | 2/2001 |

OTHER PUBLICATIONS

ChoiceMail FAQ, What is ChoiceMail, http://www.digiportal.com/support/choicemail/faq.html.

(Continued)

*Primary Examiner* — Phuoc Nguyen
(74) *Attorney, Agent, or Firm* — Lewis Roca Rothgerber LLP

(57) ABSTRACT

Handling a message comprises: classifying an incoming message for a recipient, storing the classified message and providing a notification to the recipient, wherein the notification includes summary information about the classified message and an interface that allows the recipient to operate on the classified message.

19 Claims, 6 Drawing Sheets

(56) References Cited

U.S. PATENT DOCUMENTS

| | | | | |
|---|---|---|---|---|
| 6,965,919 | B1* | 11/2005 | Woods et al. | 709/206 |
| 7,076,527 | B2* | 7/2006 | Bellegarda et al. | 709/206 |
| 7,117,358 | B2 | 10/2006 | Bandini et al. | |
| 7,120,865 | B1 | 10/2006 | Horvitz et al. | |
| 7,149,778 | B1 | 12/2006 | Patel et al. | |
| 7,219,148 | B2 | 5/2007 | Rounthwaite et al. | |
| 7,257,773 | B1* | 8/2007 | Jagger et al. | 715/210 |
| 7,389,413 | B2* | 6/2008 | Bandini et al. | 713/153 |
| 7,406,502 | B1 | 7/2008 | Oliver et al. | |
| 7,539,726 | B1 | 5/2009 | Wilson et al. | |
| 7,546,348 | B2 | 6/2009 | Wilson et al. | |
| 7,707,252 | B1 | 4/2010 | Harris | |
| 7,779,080 | B2* | 8/2010 | Pang | 709/206 |
| 7,925,707 | B2 | 4/2011 | Wilson et al. | |
| 8,046,832 | B2 | 10/2011 | Goodman et al. | |
| 8,219,620 | B2* | 7/2012 | Hart | 709/206 |
| 8,285,804 | B2 | 10/2012 | Wilson et al. | |
| 2003/0074397 | A1 | 4/2003 | Morin et al. | |
| 2003/0177190 | A1 | 9/2003 | Moody et al. | |
| 2003/0182383 | A1 | 9/2003 | He | |
| 2003/0195937 | A1 | 10/2003 | Kircher et al. | |
| 2003/0204569 | A1 | 10/2003 | Andrews et al. | |
| 2004/0019645 | A1 | 1/2004 | Goodman et al. | |
| 2004/0177110 | A1 | 9/2004 | Rounthwaite et al. | |
| 2004/0181581 | A1 | 9/2004 | Kosco | |
| 2005/0081059 | A1 | 4/2005 | Bandini et al. | |
| 2005/0204001 | A1 | 9/2005 | Stein et al. | |
| 2006/0031346 | A1 | 2/2006 | Zheng et al. | |
| 2011/0238765 | A1 | 9/2011 | Wilson et al. | |

OTHER PUBLICATIONS eBay Recommendations—Not Spam?!?, Vendio Community, http://www.auctionwatch.com/mesg/read.html?num=2&thread=37.sub.--9361.

eBay, eBay Recommendations Learn More, Learn more about eBay's Recommendations feature, http://pages.ebay.com/search/items/recommendations.sub.--learnmore.html.

Ina Steiner, AuctionBytes-Update No. 39, Jun. 3, 2001, http://www.auctionbytes.com/Email.sub.--Newsletter/39/39.html#thisthat.

Kevin Kelleher, digest man pages, Majordomo-Docs, Aug. 1996 http://www.greatcircle.com/lists/majordomo-docs/mhonarc/major-domo-docs.19-9608/msg00002.html.

Mailblocks, Challenge Messages, http://support.mailblocks.com/tab.sub.--howto/Validation/detail.sub.--pri- vacy.sub.--challenge.asp.

Mailblocks, Say goodbye to spam with mailblocks high performance email service, http://about.mailblocks.com/challenge.html.

Nicole Foon, General Review on Norton AntiVirus 2000, Jun. 12, 1999 http://instruct.uwo.ca/gplis/640/nfoon/norton.htm.

Norton Internet Security 2001 Family Edition Version 3—Review http://www.activewin.com/reviews/software/utils/norton/nis2001v3/nav.shtm- I.

Paul Hoffman & Dave Crocker, Unsolicited Bulk Email: Mechanisms for Control, Internet Mail Consortium Report: UBE-SOL, Revised May 4, 1998 http://www.imc.org/ube-sol.html.

Spamarrest, How it works—Step 1. Easy to use, Stop Spam in a Matter of Minutes, http://spamarrest.com/products/howitworks.jsp.

SpamCop-Mail, Anti Virus Quarantine, Sep. 27, 2002 http://news.spamcop.net/pipermail/spamcop-mail/2002-September/004488.html.

Williams, Blumenthal, Correspondence Negotiation Protocol, http://www.cs.sfu.ca/.about.cameron/CNP/html.

PCT Search Report and Written Opinion for PCT/US04/012465 mailed May 21, 2007.

U.S. Appl. No. 10/830,410 Final Office Action mailed Aug. 6, 2008.
U.S. Appl. No. 10/830,410 Office Action mailed Feb. 6, 2008.
U.S. Appl. No. 10/830,410 Final Office Action mailed Sep. 21, 2007.
U.S. Appl. No. 10/830,410 Office Action mailed Feb. 20, 2007.
U.S. Appl. No. 11/927,514 Final Office Action mailed Apr. 1, 2010.
U.S. Appl. No. 11/927,514 Office Action mailed Sep. 16, 2009.
U.S. Appl. No. 13/085,421 Office Action mailed Nov. 28, 2011.

* cited by examiner

*FIG. 3A*

DECLASSIFYING OF SUSPICIOUS MESSAGES

CROSS-REFERENCE TO RELATED APPLICATION

The present application is a continuation and claims the priority benefit of U.S. patent application Ser. No. 13/085,421 filed Apr. 12, 2011, now U.S. Pat. No. 8,285,804, which is a continuation and claims the priority benefit of U.S. patent application Ser. No. 11/927,514 filed Oct. 29, 2007, now U.S. Pat. No. 7,925,707, which is a continuation and claims the priority benefit of U.S. patent application Ser. No. 10/830,410 filed Apr. 21, 2004, now U.S. Pat. No. 7,546,348, which claims the priority benefit of U.S. provisional application 60/469,093 filed May 5, 2003, the disclosures of which are incorporated herein by reference.

BACKGROUND OF THE INVENTION

1. Field of the Invention

The present invention relates generally to electronic messages. More specifically, handling messages with selective user participation is disclosed.

2. Description of the Related Art

Electronic messages have become an indispensable part of modern communication. Electronic messages such as email or instant messages are popular because they are fast, easy, and have essentially no incremental cost. Unfortunately, these advantages of electronic messages are also exploited by marketers who regularly send out unsolicited junk messages. The junk messages are referred to as "spam", and spam senders are referred to as "spammers". Spam messages are a nuisance to users. They clog email inboxes, waste system resources, often promote distasteful subjects, and sometimes sponsor outright scams.

Although there are many existing message classification systems capable of classifying spam messages, the current message classification systems typically cannot perfectly classify every message. Sometimes a legitimate email message may be erroneously classified as spam. These types of misidentifications are sometimes referred to as "false positives". A variety of factors may lead to false positives. For example, a message may include certain keywords that would cause the spam filtering system to identify the message as spam, even though these words were used in a legitimate context. Although more sophisticated spam identification algorithms may reduce the rate of false positives, whether a message is spam is ultimately judged by the human recipient. However, requiring the user to make a classification for every message is impractical, and defeats the purpose of having a spam filtering system. It would be desirable to have a message handling system that could ameliorate the problem of false positive identifications without requiring significant effort by its users.

BRIEF DESCRIPTION OF THE DRAWINGS

Various embodiments of the invention are disclosed in the following detailed description and the accompanying drawings.

FIG. 3A is a diagram illustrating a notification according to some embodiments.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Handling messages with selective user participation is disclosed. In some embodiments, incoming messages are classified and stored if appropriate. Certain of the messages may at least preliminarily be classified as junk. Some or all of the junk messages may be selected for notification to the user and possible evaluation by the user. A notification that includes summary information about selected classified messages and an interface that allows the recipient to operate on the classified messages is provided to the recipient. For the purposes of example, handling of email messages in computer networks is discussed extensively throughout this specification. The approach is also applicable to instant messages, text or picture messages transmitted via personal digital assistants (PDAs), cellular phones, or any other appropriate applications and devices.

Figure 1:
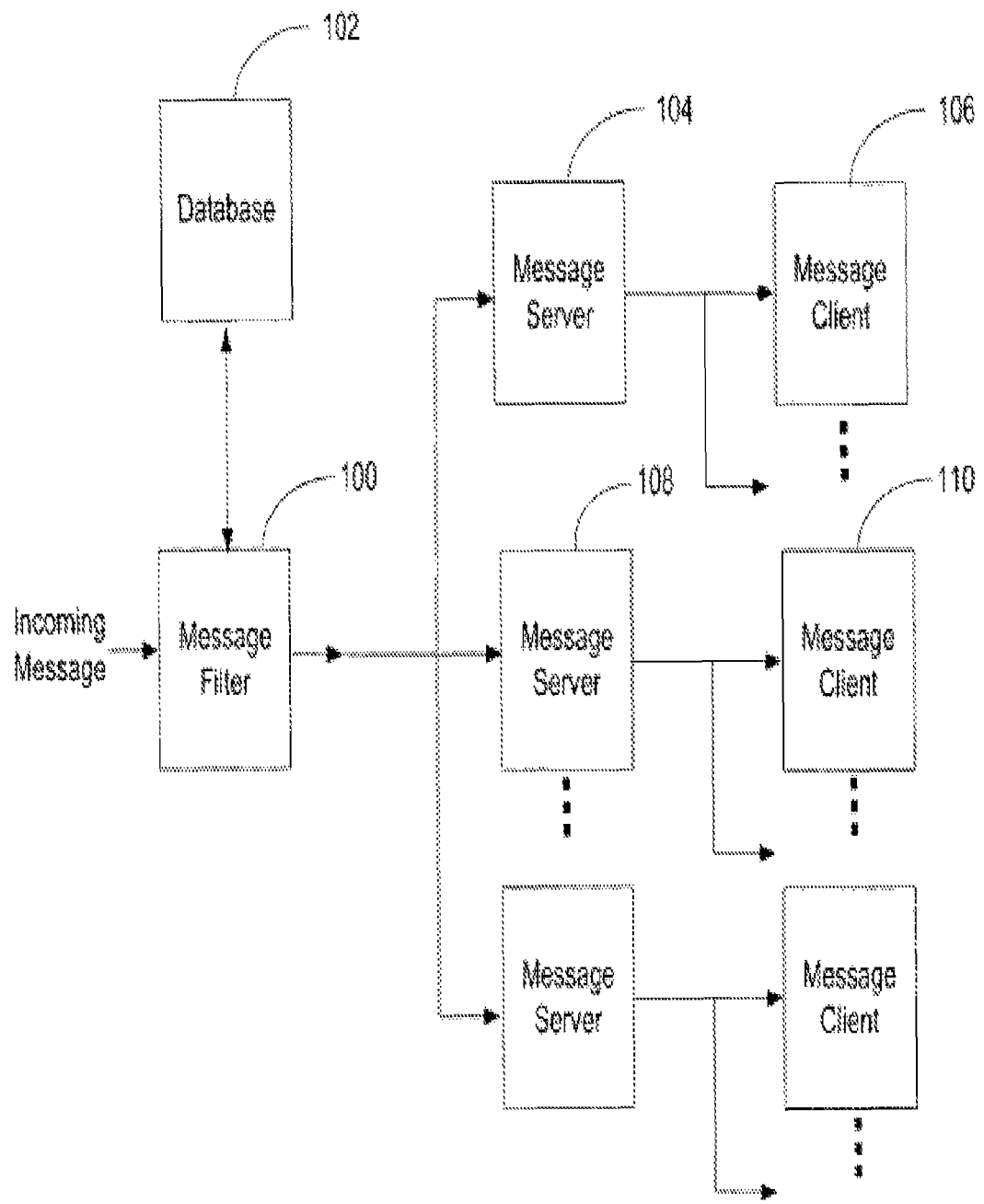
FIG. 1 is a block diagram illustrating a message handling system according to some embodiments.

FIG. 1 is a block diagram illustrating a message handling system according to some embodiments. In this example, incoming messages are classified by message filter 100. A database 102 (also referred to as a junk store) is associated with the message filter and is used to store certain classified messages. The database may be located on the same device as the message filter, or on a separate device or network (for example, the database may be a part of a data center). Message filter 100 forwards messages and notifications to message servers such as 104 and 108. Examples of such message servers include Microsoft Exchange Server, Lotus Notes Server, SendMail server, etc. The message servers distribute the messages and notifications to message clients (such as 106 and 110) that send and receive messages and provide an interface for a user to interact with the messages and notifications.

Figure 2:
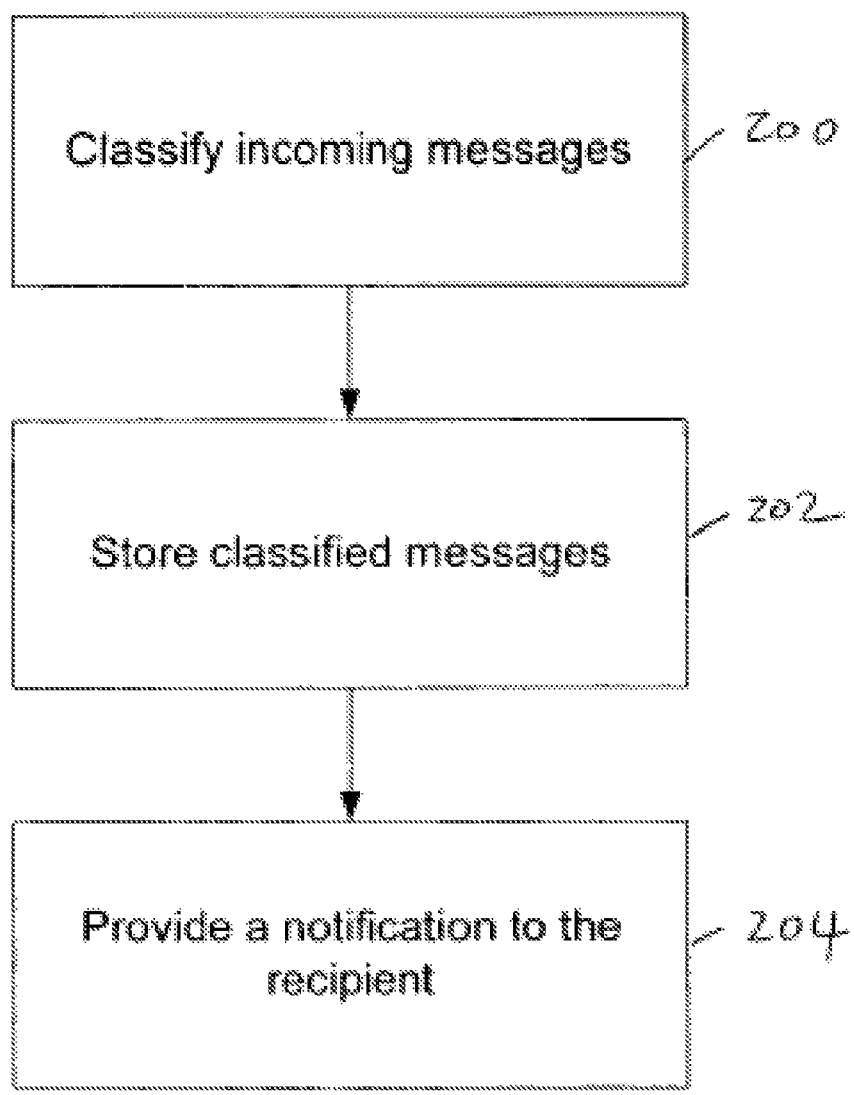
FIG. 2 is a flowchart illustrating the operations of an embodiment of a message filter.

FIG. 2 is a flowchart illustrating the operations of an embodiment of a message filter. In this example, incoming messages are classified by the message filter (200). The message filter may employ a variety of classification techniques, such as whitelisting, thumbprinting, statistical analysis, or any other appropriate methods. The classified messages are stored if appropriate (202). Messages may be classified as good, non-spam messages or suspicious messages that are potentially junk. The suspicious messages are blocked by the message filter and not delivered to the recipients immediately. The suspicious messages are temporarily stored (or "quarantined") in a database/junk store associated with the message filter, such as database 102 of FIG. 1. In some embodiments, the quarantined messages are stored on a per-recipient basis in the database. At a prescribed time, notifications about the classified messages are provided to the recipients (204). In some embodiments, a notification to a recipient includes information about the latest quarantined messages (i.e. messages that have been quarantined since the last notification was sent) for this recipient, and an interface that allows the recipient to operate on the message. Details of the notification are described below.

Figure 3A:
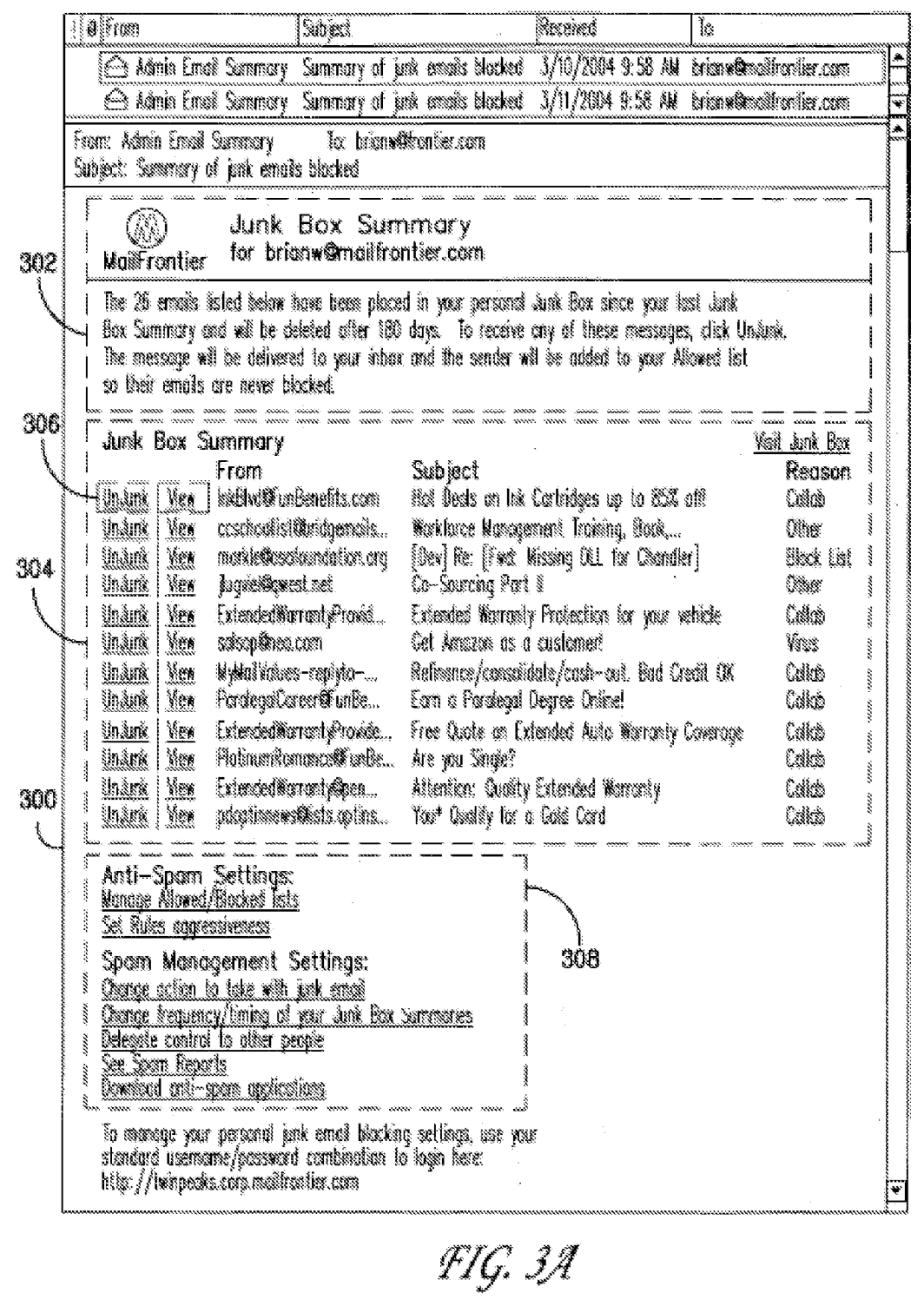

FIG. 3A is a diagram illustrating a notification according to some embodiments. In this example, the notification is generated periodically and sent to the recipient/user at a scheduled time as an email message in HTML format. The content of notification 300 is displayed in the message client as a regular email. Included in the notification is a report 302 that provides the recipient with more details about the quarantined messages, such as the recipient address, number of messages placed in the junk box, instructions for retrieving any of the messages, the number of days until the quarantined messages are deleted if no action is taken, etc.

Also included in the notification is a summary of the quarantined messages. In this example, summary 304 displays the sender address and the subject of each quarantined message as well as the reason for quarantining the message. Examples of the reason include that the message is from a sender on the block list, the message is determined to be a virus, other users have classified the message as junk, etc. An interface (such as interface 306) is provided with each message to allow the recipient to operate on the message. In the example shown, the interface includes an "unjunk" link and a "view" link. In some embodiments, if "unjunk" is selected, the message is delivered to the recipient's inbox as a regular email message. The message in the database may be deleted, or marked as having been delivered. In some embodiments, the sender address is also added to the recipient's allowed list. In some embodiments, a popup dialog window opens to tell the recipient about the status of the email. Some of the possibilities include that the message has been delivered, that the message's quarantine period has expired, or that the message has been junked and cannot be junked again. In this example, the recipient's allowed list is managed by the message filter. Messages from addresses in the allowed list are automatically treated as good messages and are not blocked.

The "view" link is associated with a universal resource locator (URL) through which the message can be displayed. If "view" is selected, the message is shown to the user as a web page, in a safe environment on a server. If the recipient does not take any action with respect to a message, the message will be deleted from the database after its quarantine period expires. In some embodiments, the user is authenticated before he is allowed to unjunk or view messages.

Also included in the notification are settings 308 that allow the user to change various configuration options. In this example, the settings are shown as links to configuration and management pages. The settings include anti-spam settings that allow the recipient to change the addresses in the allowed/blocked list as well as how aggressive the spam classification rules should be set. The settings also include management settings, including what actions to take with junk messages (for example, the user may choose to delete the junk messages permanently, or save them to a designated folder), the frequency at which the notifications are sent, etc. The user may also delegate control to others. In other words, the user may designate another user as a delegate who can review notifications sent to the user. Any message unjunked by the delegate will be delivered to the inbox of the original intended recipient (i.e. the user). In some embodiments, the user is allowed to choose the sender email address of the notification message so that the client application can apply rules to better manage the notification messages (for example, all notifications may be configured to originate from a special email address so that they may be stored in a particular folder.)

In some embodiments, the settings may also allow the user to view spam reports and download additional anti-spam applications or upgrades. Spam reports may include information about how many messages have been filtered, along with reasons why, messages or other data of interest. In addition to managing the settings via the links provided by the notification message, the user may also change the settings by logging into a website associated with the message filter.

The notification may be generated using a template that includes variables for information specific to the recipient or the notification. In one example, the following template is used to generate the junk notification shown in FIG. 3A:

TABLE-US-00001 TABLE US-00001 <!DOCTYPE HTML PUBLIC "-//W3C//DTD HTML 4.01 Transitional// EN"><html><head><title>MailFrontier Junk Notification</ title><meta http-equiv="Content-Type" content ="text/html; charset=iso-88591"> </head><body><b><font size="2"face="verdana, Arial, Helvetica, sans-serif">Junk Box Summary for: %RECIPIENT%</FONT></ B><BR>The %NUMEMAILS% %EMAIL_OR_E- MAILS% listed below %HAS_OR_HAVE% been placed in your personal Junk Box<br>since your last Junk Box Summary and will be deleted after %NUM_DAYS% %DAY_OR_DAYS%<br><br>To receive any of these messages, click UnJunk. The message will be delivered to your inbox and the sender will be added to your Allowed List so their emails are never blocked.</font><br><br><b>Junk Box Summary</b><br><font size="1" face="monospace, Courier">-------------<br>%JUNK_ SUMMARIES%-------------------------------------</font> <b-r><font size="2" face="verdana, Arial, Helvetica, sans- serif">To manage your personal junk email blocking settings, log in using<br>your standard username/password combination: <br><a href="%ASG_LOGIN_URL%"> %ASG_LOGIN_URL%</a><br><br>Ju-nk blocking by MailFrontier, Inc.<br></font></body></html>

In the template, each variable is delimited using two "%" signs at the beginning and the end of the variable names, although any other suitable symbols may also be used. Examples of such variables include RECIPIENT (for displaying the address or user name of the recipient), NUMEMAILS (for displaying the message count of quarantined messages listed in the notification), NUM_DAYS (for displaying the number of quarantine days until the messages are deleted), JUNK_SUMMARIES (for displaying the information about the quarantined messages), ASG_LOGIN_URL (for displaying the URL associated with the website where the user may login and manage his quarantined messages), etc.

Figure 3B:
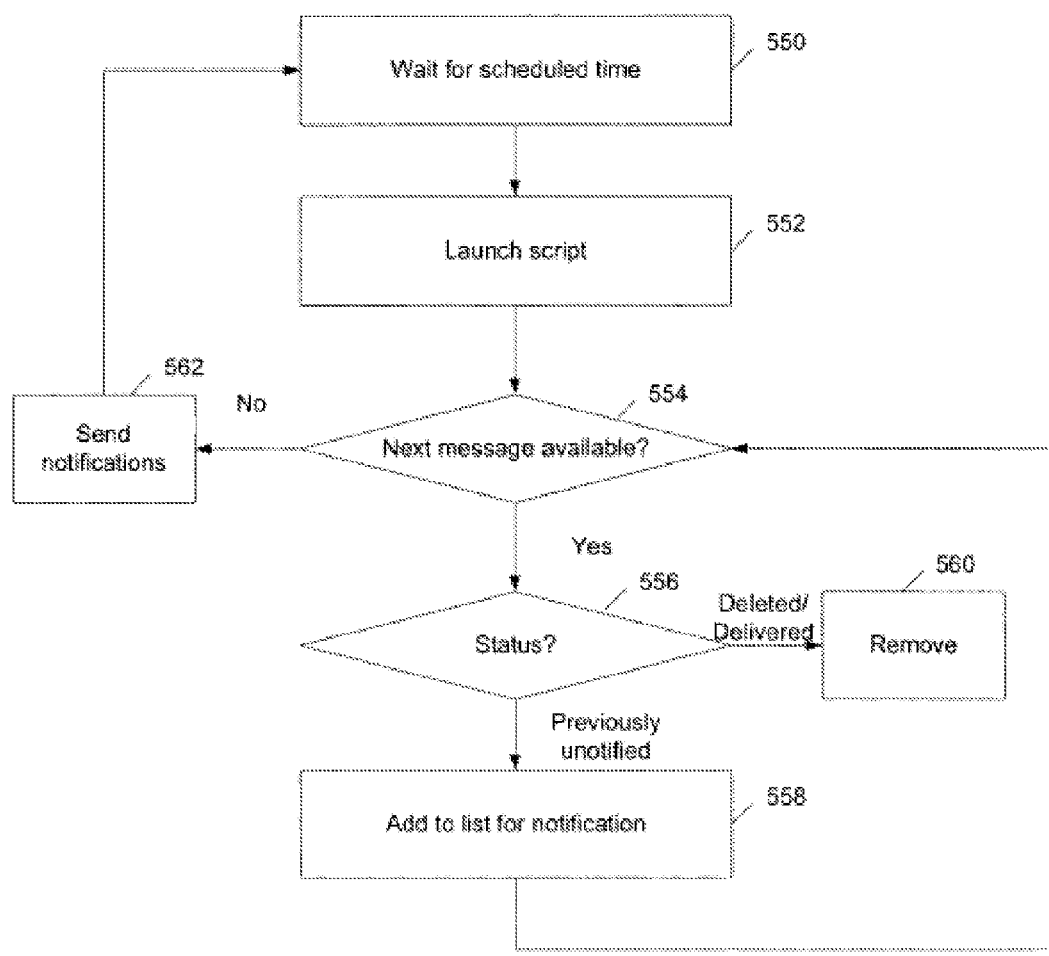
FIG. 3B is a flowchart illustrating the generation of notifications according to some embodiments.

FIG. 3B is a flowchart illustrating the generation of notifications according to some embodiments. In this example, the notifications are generated periodically according to a schedule. At a scheduled time (550), a script is launched (552). According to the script, each quarantined message in the database is examined. If a next email message is available (554), its status is checked (556). If the message is to be deleted because its quarantine period has expired, or if it has been marked as delivered because the user has unjunked it, the message is removed from the database (560). If the message has not yet been included in a notification, it is added to the list for notification (558). In some embodiments, summary information for the message, such as sender address (i.e. "From" address) and subject are added to a list indexed according to the recipient addresses. The status check is performed for all the available email in the database. When all the messages are processed, notifications to the recipients are sent (562). The process then waits until the next scheduled time (550), when the procedure is repeated.

Figure 4:
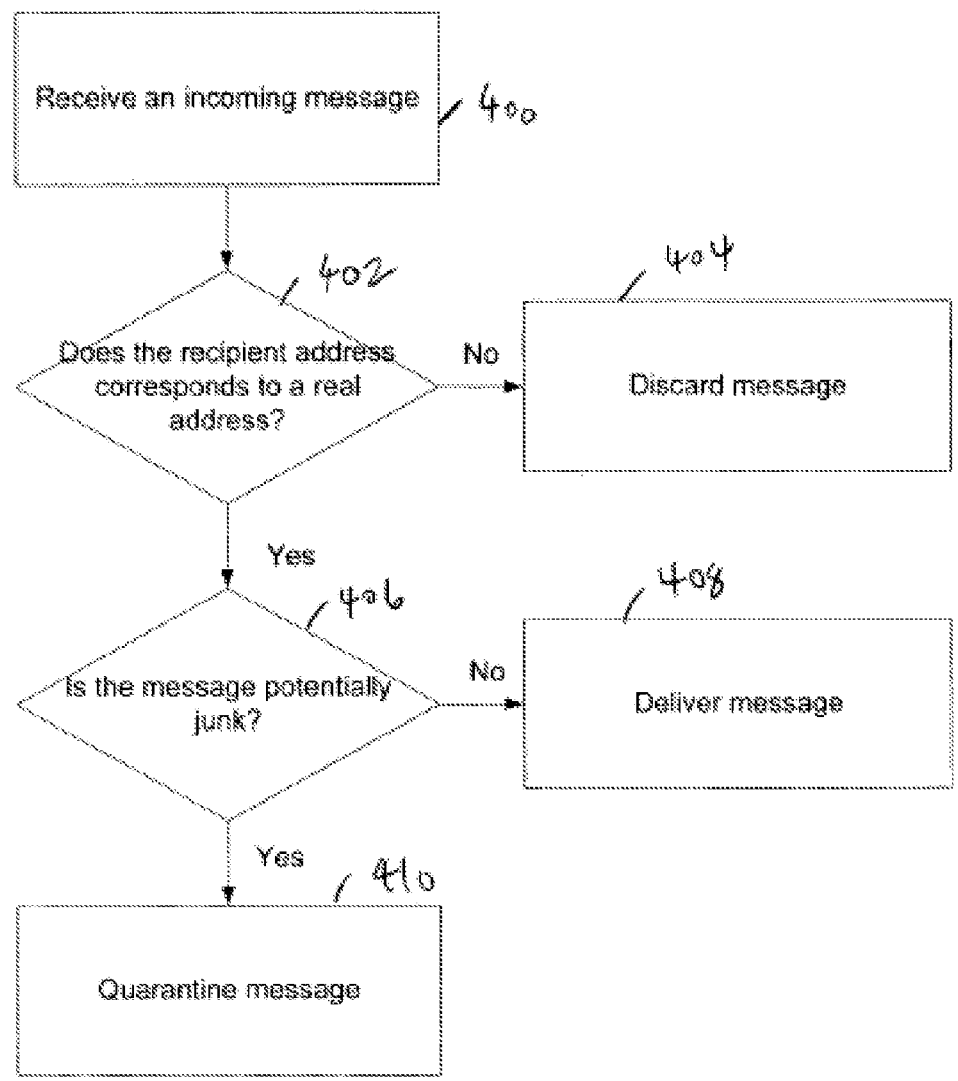
FIG. 4 is a flowchart illustrating the processing of an incoming message according to some embodiments of the message filter.

A strategy sometimes used by spammers to reach the maximum number of audience is to flood a domain with many combinations of possible user names. As a result, a large number of spam messages with non-existent user addresses may reach the message filter. In some embodiments, the message filter can reduce the number of messages to be quarantined by verifying the recipient address of the message. FIG. 4 is a flowchart illustrating the processing of an incoming message according to some embodiments of the message filter. In this example, once an incoming message is received (400), it is determined whether the recipient's address corresponds to a real address (402). In some embodiments, the message filter cooperates with the message servers, directory servers or any appropriate devices/applications that can provide user account information. For example, the message filter may send a query based on the recipient's address to a lightweight directory access protocol (LDAP) server to determine whether the address exists in the system. If the recipient address does not correspond to a real address in the system, the message is discarded (404). If, however, the recipient address corresponds to a real address, it is classified as usual and determined whether it is potentially junk (406). If the message is not junk, it is delivered to the recipient (408). Otherwise, the message is quarantined (410).

Sometimes a user may subscribe to a distribution list (such as a mailing list) and subsequently receive messages addressed to the distribution list. For example, a user whose address is userA@mailfrontier.com may subscribe to mailing lists such as engineering@mailfrontier.com and sales@mailfrontier.com. In some embodiments, the recipient receives different notifications for the mailing list messages and the messages directly addressed to him. In other words, userA would receive three separate notifications for quarantined message addressed to userA, engineering and sales. In some embodiments, for the same recipient, the notification of quarantined messages addressed to the mailing lists and the notification of quarantined messages addressed directly to the recipient are coalesced to reduce the number of notifications one may receive. In such embodiments, userA would receive a single notification that includes information about quarantined messages addressed to userA as well as to engineering and sales mailing list. In some embodiments, the message client has additional capabilities that can identify notifications from multiple sources and combine them into a single notification.

Figure 5:
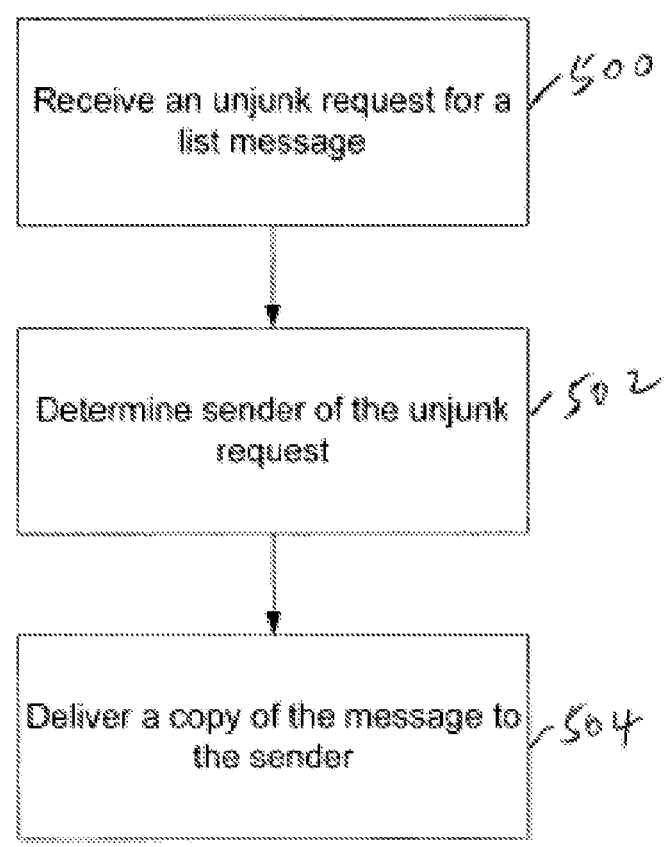
FIG. 5 is a flowchart illustrating the handling of a mailing list message according to some embodiments.

The handling of mailing list messages may vary depending on implementation. FIG. 5 is a flowchart illustrating the handling of a mailing list message according to some embodiments. In this example, the mailing list messages are handled individually on a per recipient basis. When the summary of a quarantined mailing list message is sent to a recipient, the recipient can choose to unjunk the message. Accordingly, an unjunk request is sent to the message filter. Once the message filter receives the unjunk request (500), the sender of the unjunk request is determined (502). In some embodiments, the unjunk request includes the address or other identifier of the sender who makes the request to facilitate the determination. A copy of the message is then delivered to the sender (504).

In some embodiments, the mailing list messages are handled for the entire group. When one of the mailing list's subscribers receives a notification about a quarantined mailing list message and unjunks the message, the message is delivered to all the subscribers of the mailing list. In some embodiments, a mailing list may have a delegate who reviews the notification and makes unjunk decisions for all the subscribers of the list.

Although the foregoing embodiments have been described in some detail for purposes of clarity of understanding, the invention is not limited to the details provided. There are many alternative ways of implementing the invention. The disclosed embodiments are illustrative and not restrictive

What is claimed is:

1. A method for sending notifications regarding declassification of suspicious messages, the method comprising:
   intercepting a suspicious message at a message filter, wherein the message is addressed to a plurality of recipients;
   executing instructions stored in memory, wherein execution of the instructions by a processor:
      identifies that the plurality of recipients include an individual user and one or more mailing lists,
      determines that the individual user is also subscribed to the one or more mailing lists, and
      generates a notification for each of the plurality of recipients, wherein a notification to the individual user is coalesced with a notification to the user as subscriber of the one or more mailing lists; and
   sending the coalesced notification to the user, wherein the user receives only one notification regarding the suspicious message.

2. The method of claim 1, wherein the generation of the notification occurs periodically according to a schedule.

3. The method of claim 1, further comprising determining that the message is suspicious.

4. The method of claim 3, wherein the determination that the message is suspicious is based on the message being addressed to one or more non-existent user addresses.

5. The method of claim 1, wherein the message is an electronic mail message.

6. The method of claim 1, wherein the message is an instant message.

7. The method of claim 1, wherein the message is a text message.

8. The method of claim 1, wherein the message is a multimedia (picture) message.

9. The method of claim 1, wherein the user has designated a delegate for receiving the notification and further comprising redirecting the notification to the designated delegate.

10. A system for sending notifications regarding declassification of suspicious messages, the method comprising:
    a message filter for intercepting a suspicious message at a message filter, wherein the message is addressed to a plurality of recipients;

a processor for executing instructions stored in memory, wherein execution of the instructions by the processor:
    identifies that the plurality of recipients include an individual user and one or more mailing lists,
    determines that the individual user is also subscribed to the one or more mailing lists, and
    generates a notification for each of the plurality of recipients, wherein a notification to the individual user is coalesced with a notification to the user as subscriber of the one or more mailing lists; and
an interface for sending the coalesced notification to the user, wherein the user receives only one notification regarding the suspicious message.

11. The system of claim 10, wherein the generation of the notification occurs periodically according to a schedule.

12. The system of claim 10, wherein the processor executes further instructions to determine that the message is suspicious.

13. The system of claim 12, wherein the determination that the message is suspicious is based on the message being addressed to one or more non-existent user addresses.

14. The system of claim 10, wherein the message is an electronic mail message.

15. The system of claim 10, wherein the message is an instant message.

16. The system of claim 10, wherein the message is a text message.

17. The system of claim 10, wherein the message is a multimedia (picture) message.

18. The system of claim 10, wherein the user has designated a delegate for receiving the notification and wherein the interface redirects the notification to the designated delegate.

19. A non-transitory computer-readable storage medium, having embodied thereon a program executable by a processor to perform a method for sending notifications regarding declassification of suspicious messages, the method comprising:
    intercepting a suspicious message at a message filter, wherein the message is addressed to a plurality of recipients;
    identifying that the plurality of recipients include an individual user and one or more mailing lists;
    determining that the individual user is also subscribed to the one or more mailing lists;
    generating a notification for each of the plurality of recipients, wherein a notification to the individual user is coalesced with a notification to the user as subscriber of the one or more mailing lists; and
    sending the coalesced notification to the user, wherein the user receives only one notification regarding the suspicious message.

* * * * *